United States Patent
Wirtz et al.

(10) Patent No.: US 9,989,430 B2
(45) Date of Patent: Jun. 5, 2018

(54) TEST BENCH WITH A COOLING GAS INFLOW DEVICE

(71) Applicant: HORIBA Europe GmbH, Darmstadt (DE)

(72) Inventors: Michael Wirtz, Frankfurt am Main (DE); Tobias Kurze, Darmstadt (DE)

(73) Assignee: HORIBA Europe GmbH, Darmstadt (DE)

( * ) Notice: Subject to any disclaimer, the term of this patent is extended or adjusted under 35 U.S.C. 154(b) by 0 days. days.

(21) Appl. No.: 15/503,580

(22) PCT Filed: Aug. 11, 2015

(86) PCT No.: PCT/EP2015/068408
§ 371 (c)(1),
(2) Date: Feb. 13, 2017

(87) PCT Pub. No.: WO2016/023878
PCT Pub. Date: Feb. 18, 2016

(65) Prior Publication Data
US 2017/0241850 A1  Aug. 24, 2017

(30) Foreign Application Priority Data
Aug. 13, 2014  (DE) .................. 10 2014 111 585

(51) Int. Cl.
*G01L 5/28* (2006.01)
*G01M 15/02* (2006.01)
*G01M 17/007* (2006.01)

(52) U.S. Cl.
CPC ............ *G01L 5/28* (2013.01); *G01M 15/02* (2013.01); *G01M 17/007* (2013.01)

(58) Field of Classification Search
CPC ...... G01M 9/04; G01M 9/065; G01M 17/007; G01M 15/02; G01L 5/28
See application file for complete search history.

(56) References Cited

U.S. PATENT DOCUMENTS 4,251,027 A * 2/1981 Dehart ................ F24F 11/04
                                                        137/500
5,483,829 A * 1/1996 Caron ................. F15D 1/00
                                                         73/198
(Continued)

FOREIGN PATENT DOCUMENTS

DE        10351792 A1    6/2005
DE    102007023136 A1   11/2008
(Continued)

OTHER PUBLICATIONS

"Variation, coefficient of." The Penguin Dictionary of Mathematics, edited by David Nelson, Penguin, 4th edition, 2008. Credo Reference, http://search.credoreference.com/content/entry/penguinmath/variation_coefficient_of/0?institutionId=743. Accessed Sep. 14, 2017.*

*Primary Examiner* — Lisa Caputo
*Assistant Examiner* — Punam Roy
(74) *Attorney, Agent, or Firm* — Murphy, Bilak & Homiller, PLLC

(57) ABSTRACT

The invention relates to a test bench (10) for testing a test specimen (14), comprising a load device for generating a load for the test specimen, a test specimen holder (16) for holding the test specimen and for introducing the load onto the test specimen, and a cooling gas inflow device (32) for cooling the test specimen by means of a cooling gas stream exiting an outlet opening (48) of the cooling gas inflow device. In this case, the cooling gas inflow device is designed such that the cooling gas flow inside the cooling gas inflow device is divided into at least two part cooling gas streams in at least one section of the cooling gas inflow device.

14 Claims, 4 Drawing Sheets

(56) References Cited

U.S. PATENT DOCUMENTS

Figure 1:
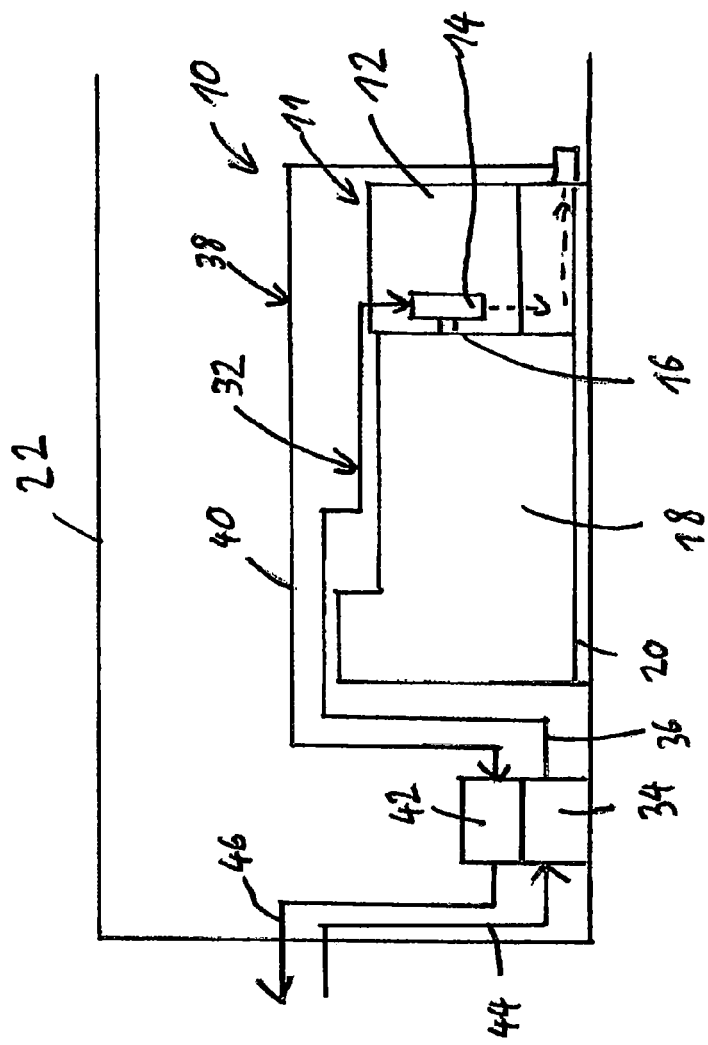

| | | | | |
|---|---|---|---|---|
| 5,495,754 | A * | 3/1996 | Starr, Jr. | G01M 9/02 73/146 |
| 5,515,712 | A * | 5/1996 | Yunick | G01M 15/02 73/114.55 |
| 5,592,372 | A * | 1/1997 | Artail | G01M 17/007 700/73 |
| 5,915,343 | A * | 6/1999 | Zenobi | G01M 15/02 123/41.01 |
| 6,023,890 | A * | 2/2000 | Zenobi | G01M 7/02 52/64 |
| 6,526,841 | B1 * | 3/2003 | Wanek | G01R 31/2849 324/750.08 |
| 6,725,912 | B1 * | 4/2004 | Moll | G01M 9/02 165/140 |
| 6,997,049 | B2 * | 2/2006 | Lacey, Jr. | G01M 9/02 257/E29.272 |
| 7,401,505 | B1 * | 7/2008 | Schultz | G01M 9/04 73/147 |
| 7,743,650 | B2 * | 6/2010 | Engstrom | F04D 19/007 73/114.68 |
| 7,946,812 | B2 * | 5/2011 | Lambolez | G01M 17/0074 415/211.2 |
| 8,042,386 | B2 | 10/2011 | Kato et al. | |
| 8,061,893 | B2 * | 11/2011 | Su | G01R 31/343 318/490 |
| 8,448,505 | B2 * | 5/2013 | Sennhenn | G01M 15/02 73/116.05 |
| 9,302,665 | B2 * | 4/2016 | Germann | B60T 17/221 |
| 2002/0043102 | A1 * | 4/2002 | Cordes | G01L 5/282 73/116.08 |
| 2009/0126510 | A1 * | 5/2009 | Engstrom | G01M 17/0072 73/862.14 |
| 2014/0230788 | A1 * | 8/2014 | Tiusanen | G01M 15/02 123/434 |
| 2017/0052090 | A1 * | 2/2017 | Jentsch | G01N 17/002 |
| 2017/0102287 | A1 * | 4/2017 | Okerson | G01M 9/04 |

FOREIGN PATENT DOCUMENTS

| | | |
|---|---|---|
| DE | 102008032760 A1 | 4/2009 |
| EP | 0845666 A1 | 6/1998 |
| EP | 0857959 A1 | 8/1998 |
| EP | 1253416 A2 | 10/2002 |
| WO | 2006089536 A1 | 8/2006 |
| WO | 2010142366 A1 | 12/2010 |

* cited by examiner

TEST BENCH WITH A COOLING GAS INFLOW DEVICE

The invention is concerned with a test bench for testing a test specimen, the test bench comprising a cooling gas inflow device for cooling the test specimen, and, in particular, a brake test bench having a cooling gas inflow device.

Test benches are in particular used for testing of vehicles and vehicle components such as e.g. combustion engines, power trains, and brakes. Here, the test specimen is coupled with load means and a load acting onto the test specimen from the load means is monitored. For testing a combustion engine the load means acts as a brake and may e.g. be realized by a dynamometer, a hydraulic brake, or an eddy-current brake. In order to test a brake the load means has to be designed as drive means and may for example be realized by a dynamometer (e.g. a direct current motor or an asynchronous motor). The load means, the test specimen, and the measurement means are coupled to each other via suitable components, such as for example drive shafts, couplings, and levers, in order to be able to reliably transfer the acting torques and forces.

Brake test benches serve for testing, in particular, brakes of vehicles, for example regarding wear, frictional coefficient, noise emission, durability, or performance. To this end, the brake to be tested is connected with the test bench. Here, it is on the one hand possible to mount the brake as a separate element into the test bench and connect it there with test bench components. On the other hand it is possible to install a complete vehicle or also parts of a vehicle (axle components and the like) and to connect thereafter the brake to be tested with the test bench. The brake is then driven or loaded in a known manner by a dynamometer of the test bench.

During the introduction of load onto the test specimen, for example of a brake pressure onto a brake to be tested, the applied braking power is dissipated as heat. In known test benches for brakes this heat is carried away by a cooling gas stream that is directed onto the test specimen. In order to obtain reliable test results it is necessary to ensure a defined test environment during a test period. For non-uniform cooling of a brake disc, a deformation thereof in a radial and/or tangential direction may occur because of inhomogeneous heating of the brake disc. This disadvantageous effect of deformation of the brake disc into the form of a shield is called "shielding (Schirmung)". Such as deformation of the brake disc leads to falsified and non-reproducible, and hence non-comparable measurement results. Further, a deformation of the brake disc may lead to higher residual slip moments.

Hence, the invention solves the problem to provide a test bench for testing a test specimen, in particular a brake test bench, having a controlled and reproducible gas cooling of the test specimen.

This object is solved by the test bench according to claim 1. Advantageous embodiments and further examples of the invention are defined in the dependent claims.

According to the invention a test bench for testing a test specimen is provided comprising a load device for generating a load for the test specimen, a test specimen holder for holding the test specimen and for introducing the load onto the test specimen, and a cooling gas inflow device for cooling the test specimen by means of a cooling gas stream exiting an outlet opening of the cooling gas inflow device. Here, the cooling gas inflow device is designed such that the cooling gas stream inside the cooling gas inflow device is divided into at least two partial cooling gas streams in at least one section of the cooling gas inflow device.

Hence, a test bench for testing a test specimen, in particular a test bench for brakes is provided that allows uniform cooling of the brake disc to be tested or of a differently formed test specimen to be cooled by means of the cooling gas inflow device according to the invention. Here, it is ensured that from the cooling gas inflow device a uniform airflow is exiting that is directed homogeneously onto the brake disc to be tested, in particular parallel to the brake disc plane and perpendicular to the rotation axis of the brake disc, or including a defined angle with the brake disc plane. The flow velocity distribution that is homogeneous over the flow cross section is achieved by partitioning the cooling airflow in particular in bent sections such as to prevent streaming of the cooling gas along an outer lateral face of a curved section of the cooling gas inflow device, which would lead to an inhomogeneous flow distribution inside the supply pipe.

In order to obtain meaningful and reproducible measurement results with respect to the test procedure of the test specimen it will be advantageous, if the test bench comprises further measurement means for measuring a measured variable acting on the test specimen.

In order to obtain an even more homogeneous cooling gas flow at the outlet opening of the cooling gas inflow device, it is preferable that the cooling gas stream inside the cooling gas inflow device is divided in at least one section of the cooling gas inflow device in preferable at least three, further preferable at least five, and in particular at least ten partial cooling gas streams.

In order to apply the cooling gas homogeneously onto the test specimen it will be advantageous, if the cooling gas inflow device comprises a cooling gas source and a supply, whose outlet opening is arranged in a vertical direction above the test specimen holder.

To further improve the cooling effect or to be able to set a predetermined cooling gas temperature, it will be advantageous, if the cooling gas source is a blower means or an air conditioner having blower means.

In order to generate also in a bent section of the cooling gas inflow device a homogeneous cooling gas stream, it will be advantageous, if cooling gas deflection surfaces are arranged in a non-straight section of the cooling gas inflow device.

In order to obtain a homogeneous cooling gas stream also in a straight section of the cooling gas inflow device, it will be advantageous, if a flow straightener is arranged in such a section.

In order to provide a defined distance and hence a defined cooling environment for the test specimen, it will be desirable, if an end of the cooling gas inflow device facing the test specimen holder can be elongated telescopically such that the distance between the outlet opening of the cooling gas inflow device and the test specimen holder can be adjusted.

In order to provide in particular in the end region of the cooling gas inflow device a homogeneous cooling gas stream, it will be advantageous, if a flow straightener is arranged stationary with respect to the outlet opening of the cooling gas inflow device in the end of the cooling gas inflow device, which can be elongated telescopically.

Here, it will be advantageous, if the variation coefficient of a flow velocity distribution at the outlet opening of the cooling gas inflow device is preferably smaller than 30%, further preferably smaller than 20% or 15% and in particular smaller than 10%.

The cooling gas inflow device according to the invention will be particularly advantageous, if the test bench is provided for testing a brake.

In order to provide in addition to a defined cooling gas supply also a defined cooling gas exhaustion it will be particularly advantageous, if the cooling gas exhaustion device is designed such that the exhausted cooling gas stream inside the cooling gas exhaustion device is divided in at least one section of the cooling gas exhaustion device into at least two partial cooling gas streams.

Here, it will be advantageous, if cooling gas deflection surfaces are arranged in a non-straight section of the cooling gas exhaustion device.

Here, it will be advantageous, if the variation coefficient of a flow velocity distribution at an inlet opening of the cooling gas exhaustion device is preferably smaller than 30%, further preferably small than 20% or 15% and in particular smaller than 10%.

In order to provide a defined test environment for the test specimen it will be in particular advantageous, if the test bench comprises further a housing, in which the outlet opening of the cooling gas inflow device is provided in vertical direction above the test specimen holder, and in which an inlet opening of the cooling gas exhaustion device is arranged vertically below the test specimen holder.

Figure 2:
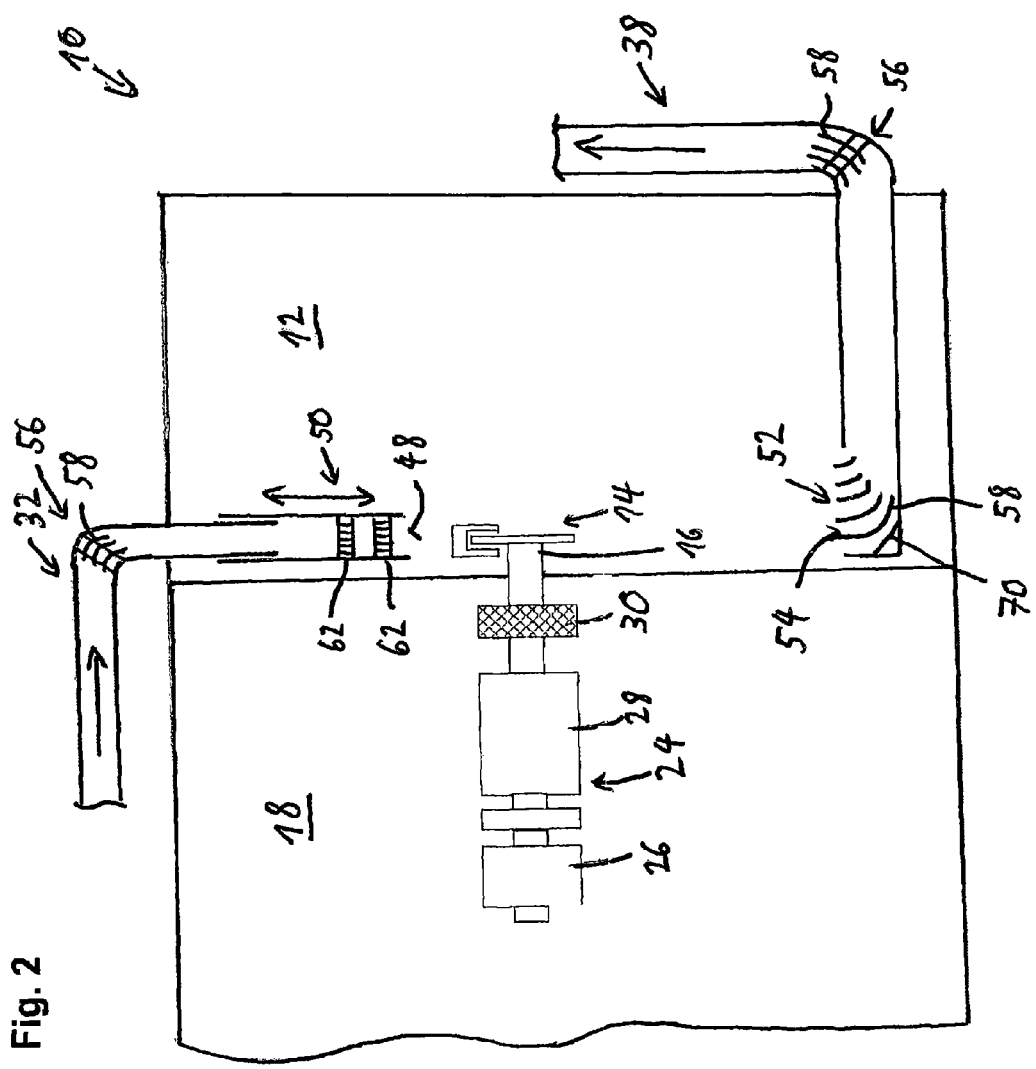
Figure 3:
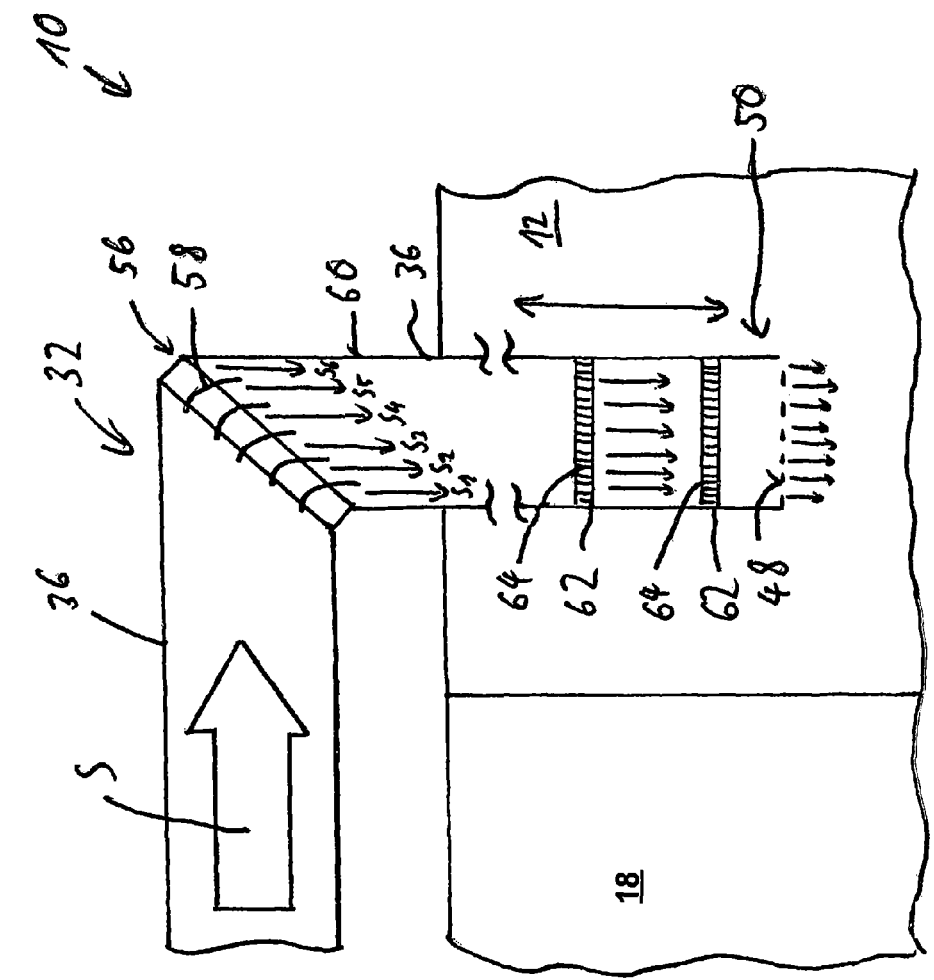
Figure 4:
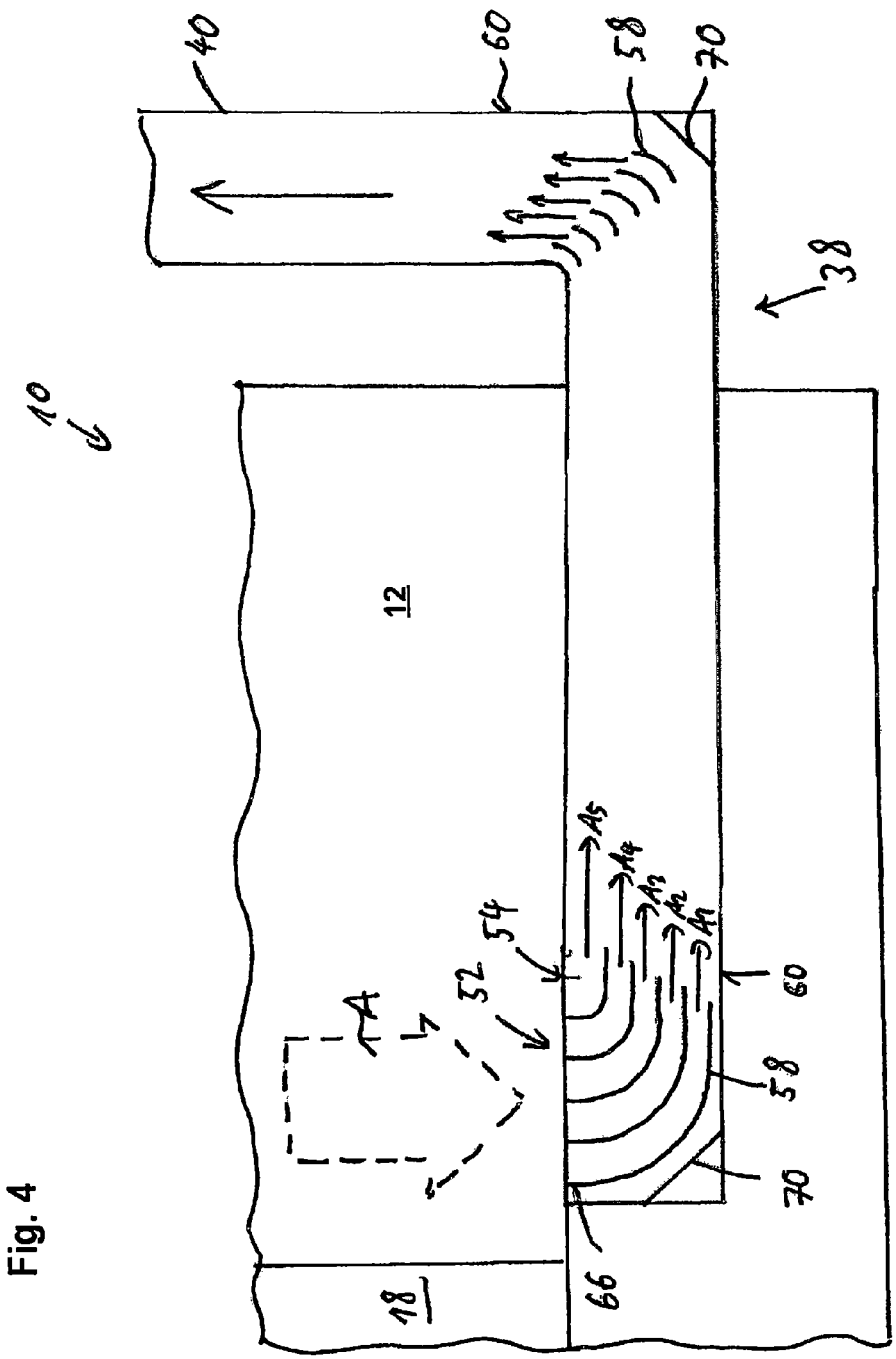

In the following the invention will be described exemplarily based on the figures. It shows:

FIG. 1 a schematic view a test bench according an embodiment of the invention, FIG. 2 a schematic detailed view of a test cabin of a test bench according to an embodiment of the invention, FIG. 3 a schematic detailed view of a cooling gas inflow device according to an embodiment of the invention, and FIG. 4 a schematic detailed view of a cooling exhaust device according to an embodiment of the invention.

In the various figures of the drawings elements corresponding to each other are designated with the same reference signs.

FIG. 1 shows a schematic view of a test bench 10 according to an embodiment of the invention. The test bench 10 comprises a test cabin 11 having a housing 12 in which a test specimen 14 is mounted onto a test specimen holder 16. The test bench 10 comprises further a test bench body 18 in which a load device for generating a load for the test specimen 14, and measurement means for measuring a measured variable acting onto the test specimen may be provided, as will be described with respect to FIG. 2 in more detail below. The test specimen holder 16 is provided for holding the test specimen 14 as well as for introducing the load to the test specimen 14. The test bench 10 may further comprise a device for vibration isolation 20 on which the test bench may be set up within a building 22.

As is illustrated in more detail in FIG. 2 the test bench 10 comprises in test bench body 18 a main shaft 24 having a flywheel 26, load means 28 being designed as drive, and torque measurement means 30. The main shaft 24 may be segmented into different sections that are connected with each other in a known manner, for example by cardan shafts. The load means 28 may for example be formed by a dynamometer, i.e. for example by a direct current motor. At one end of the main shaft 24 the test specimen 14, being formed as vehicle brake, is installed, which is not a component of the test bench 10.

The test bench 10 is preferably formed as a flywheel mass test bench for brakes, which is designed for analyzing performance and/or noise emission of brake systems. The brake test bench 10 may comprise a plurality of functions in order to carry out experiments under realistic operation conditions, These include in particular a precise flywheel mass simulation and exact control of the test specimen 14. Optionally, the functionality may also comprise experiments with variable environmental conditions such as temperature, humidity, fog formation, or simulation of rain. The measurement means for measuring a measured variable acting onto the test specimen 14 may comprise the torque measurement means 30. The measurement means may however also comprise further measurement systems such as measurement systems regarding number of revolutions, brake pressure, braking torque and temperature. Further, the measurement means may comprise a video camera inside test room 12 for recording and controlling of experiments. Further, the measurement means may comprise a telemetry system for rotating temperatures having up to eight channels.

For a reproducible and defined measurement environment a homogeneous cooling of the test specimen 14 is of utmost importance. As illustrated in FIGS. 1 and 2 a cooling gas inflow device 32 is provided for cooling the test specimen 14. The cooling gas inflow device 32 comprises a cooling gas source 34 and a supply 36 through which the cooling gas stream is guided to the test specimen 14 inside the housing 12. The test bench 10 comprises further a cooling gas exhaust device 38 through which the cooling gas stream directed from the cooling gas inflow device 32 onto the test specimen 14 is sucked in and guided via an exhaust line 40 through a cooling gas drain 42 out of the inside of the building 22. The cooling gas source 34 is supplied via an inlet of fresh air 44 with cooling gas, typically with cooling air. The cooling gas exhausted via the cooling gas exhaust device 38 is disposed via the cooling gas drain 42 out of the building 22 via an exhaust air outlet 46.

The cooling gas source 34 may be provided together with the cooling gas drain 42 as blower means or as an air conditioner having blower means. By using an air conditioner the cooling gas stream may be brought to a defined temperature. As air conditioner for example a water-cooled air conditioner may be used. It is for example also conceivable to adjust the temperature of the cooling gas stream for specific measurements to temperatures that are higher than an outside temperature, i.e. to heat the cooling gas stream, such that it has a defined and reproducible cooling gas stream temperature.

The test specimen 14 is cooled by means of a cooling gas stream exiting from an outlet opening 48 of the cooling gas inflow 32 as illustrated in FIG. 2. The test specimen 14 having the brake disc and a brake calliper is here illustrated purely schematically, the arrangement of the brake calliper being typically made such that a uniform application of a cooling gas stream onto the brake disk of the test specimen 14 is possible. The outlet opening 48 is arranged in vertical direction above the test specimen holder 16 as well as above the test specimen 14 held in the test specimen holder 16.

Here, an end 50 of the cooling gas inflow device 32 facing the test specimen holder 16 can be elongated telescopically such that the distance between the outlet opening 48 of the cooling gas inflow device 32 and the test specimen holder 16 as well as the test specimen 14 can be adjusted. Due to this, during testing of test specimens 14 having different sizes the distance of the outlet opening 48 of the cooling gas inflow device 32 and a lateral side of the test specimen 14 can be set to the same distance in all cases in order to provide a predefined measurement environment. The outlet opening 48 of the cooling gas inflow device 32 above the test specimen 14 may keep a minimal distance from the middle line of the drive main shaft 24, in order to allow operation as well as easy mounting of large test specimen 14 that may have a brake disc diameter of up to 60 cm. Hence, the same streaming conditions are guaranteed at the test specimen 14. A predefined distance between outlet opening 48 of the cooling gas inflow device 32 and the test specimen holder 16 for different test environments leads therefore to reproducible and comparable measurement results regarding test specimens 14 that have different disc diameters.

In vertical direction below the test specimen holder 16 an inlet opening 52 of the cooling gas exhaust device 38 is arranged. Thus, in the housing 12 of the test cabin 11 the outlet opening 38 of the cooling gas inflow device 32 is arranged in vertical direction above the test specimen holder 16 and the inlet opening 52 of the cooling gas exhaust device 38 is arranged in vertical direction below the test specimen holder, in order to ensure a predefined cooling gas supply towards and cooling gas exhaustion away from the test specimen 14, respectively. The incoming air is hence introduced above the test specimen 14 via an opening in the roof or optionally through the backside end wall of the housing 12 of the test cabin 11. Exhaust of air happens below the test specimen 14 via the outlet opening 48 in the frame of the test bench 10. The outlet opening 48 is preferably secured by a grate 54 that is safe to step on.

As illustrated in FIG. 3 in detail the cooling gas inflow device 32 is designed such that a cooling gas stream S inside the cooling gas inflow device 32 is divided in at least a section of the cooling gas inflow device 32 into at least two partial gas streams $S_i$. In this process, the cooling gas stream S may be divided inside the cooling gas inflow device 32 in at least one section of the cooling gas inflow device 32 into preferably at least three, further preferably at least five, and in particular in at least ten partial cooling gas streams $S_i$. In the embodiment illustrated in FIG. 3 the cooling gas stream S is divided into six partial cooling gas streams $S_1$ to $S_6$.

To this end, cooling gas deflection surfaces 58 are provided in the non-straight section of the cooling gas inflow device 32, i.e. in a region having a bending 56 or a 90°-curve, which cooling gas deflection surfaces 58 divide the cooling gas stream S separately into different partial cooling gas streams $S_1$ to $S_6$ and lead the partial cooling gas streams $S_1$ to $S_6$ separately into their direction. The division of the cooling gas stream S may be obtained by cooling gas deflection surfaces 58 that are arranged equally spaced. By the provision of the cooling gas deflection surfaces 58 it is prevented that the cooling gas stream S streams along a side 60 of the cooling gas inflow device 32 opposite to the inlet surfaces of the cooling gas deflection surfaces 58 and that thus a non-uniform cooling gas stream output occurs at the outlet opening 48. The supply 36 of the cooling gas inflow device 32 may be designed as pipe or hose. The cooling gas deflection surfaces 58 have to be designed according to the design of the cross-sectional area of the supply 36.

Further, within a straight section of the cooling gas inflow device 32 at least one flow straightener 62 may be arranged. For a circular cross-sectional area of the supply 32 the diameter of the supply 36 and of the outlet opening 48 lie within a range between 10 cm and 100 cm, further preferable between 10 cm and 50 cm, and in particular between 20 cm and 40 cm.

The flow straightener 62 is preferably formed as a grid made of gas guiding surfaces 64 being parallel to the straight section of the cooling gas inflow device 32. In order to achieve a uniform exit of the flow at the outlet opening 48 of the cooling gas inflow device 32 as illustrated in FIG. 3 two flow straighteners 62 having a defined distance with respect to each other are arranged stationary with respect to the outlet opening 48 of the cooling gas inflow device 32 in the end 50 of the cooling gas inflow device 32 that can be elongated telescopically. Although in FIG. 3 two flow straighteners 62 are illustrated within the end 50 that can be telescopically elongated also at least one flow straightener 62 may be arranged. According to the invention it will be preferred, if a flow straightener 62 that is arranged stationary with respect to the outlet opening 48 of the cooling gas inflow device has a maximal distance from the outlet opening 48 of preferably 30 cm, further preferably 20 cm, and in particular 10 cm. The distance of the flow straightener 62 from the outlet opening 48 may also be maximally 150%, further preferably maximally 100%, and in particular maximally 50% of the diameter of the outlet opening 48.

The cooling gas guiding surfaces 64 as well as the cooling gas deflection surfaces 58 have to be understood as devices or bodies, i.e. as plane, elongated cooling gas guiding bodies 64 and as plane, elongated cooling gas deflection bodies 58, whose extension perpendicular to the cooling gas flow is substantially smaller than their extension along the cooling gas flow direction, preferably the ratio of a length along the streaming direction to a maximal thickness of the surface perpendicular to the streaming direction is preferably larger than 100, particularly preferably larger than 500, and in particular larger than 1000. The term surface must therefore not be understood as mathematical surface, but as a stiff plane body such as for example a sheet, a plate, or a film. The cooling gas deflection surfaces 58 have preferably along their longitudinal direction, i.e. along the streaming direction, a form that deflects the cooling gas stream fluid mechanically particularly effectively. For example, at least one of the cooling deflection surfaces 58 may have a circularly cylinder segment-shaped or spiral-shaped section. The cooling gas guiding surfaces 64 as well as the cooling gas deflection surface 58 may be formed from a metal or a plastic material. The cooling gas guiding surfaces 64 as well as the cooling gas deflection surfaces 58 may be formed as cooling gas guiding plates 64 and as cooling gas deflection plates 58, if metal is used. As a metal, copper or stainless steel may be used.

By providing the cooling gas deflection surfaces 58 and/or the flow straightener 62 a uniform cooling gas stream can be generated at the outlet opening 48 of the cooling gas inflow device 32 that is directed towards the test specimen 14 in the test specimen holder 16. In the following the term uniform cooling gas stream from the outlet opening 48 will be defined more precisely. If the outlet opening 48 has for example a circular outlet cross section, a distribution of different exit velocities of the cooling gas stream components perpendicular to the outlet opening plane of the outlet opening 48 is present as is indicated in FIG. 3 purely exemplarily by arrows with different length. The exit velocity distribution of the cooling gas stream S has a specific mean value $v_{mean}$, which may have for a pipe diameter of about 30 cm values between 1 m/s to 50 m/s.

From the exit velocity distribution of the cooling gas stream S a standard deviation σ may be determined in a known manner. From the quotient of the standard deviation σ and the mean value of the exit velocity distribution of the cooling gas stream S at the outlet opening 48 the deviation from the mean value $\sigma/v_{mean}$ can be determined. The quantity $\sigma/v_{mean}$ will be called variation coefficient of the flow velocity distribution at the output opening 48 of the cooling gas inflow device 32. For a exit temperature of 20° C., a pressure inside the test bench hood of 1,013 bar and a minimal distance of the outlet cross section 48 and the test specimen holder of about 35 cm, by providing the cooling gas deflection surfaces 58 and/or the flow straightener 62 in the cooling gas inflow device 32 a variation coefficient of the flow velocity distribution at the outlet opening 48 of the cooling gas inflow device 32 can be reached according to the invention that is preferably smaller than 30%. Further preferable the variation coefficient may be smaller than 20% or 15% and in particular smaller than 10%. Due to the design of the cooling gas inflow device 32 according to the present invention even variation coefficients of the flow velocity distribution of below 5% can be reached. The lower the variation coefficient of the flow velocity distribution the more uniform is the output of the cooling gas stream S out of the outlet opening 48 of the cooling gas inflow device 32.

As illustrated in FIG. 4 the cooling gas exhaust device 38 is designed similar to the cooling gas inflow device 32 such that an exhausted cooling gas stream A within the cooling gas exhaust device 38 is divided in at least one section of the cooling gas exhaust device 38 into at least two partial cooling gas streams $A_i$. The cooling gas exhaust device 38 comprises the inlet opening 52 below the test specimen holder 16 and the test specimen 14 mounted in the test specimen holder 16. The inlet opening 52 is covered by the inlet grid or the grating 54 having support bars 66. The exhaust air A is sucked in by the cooling gas drain 42. The air stream A which is typically sucked in to the inlet opening 52 omni-directionally is deflected by cooling gas deflection surfaces 58 from a vertical direction into a lateral direction parallel to the bottom of the housing 12 and divided into partial cooling gas streams $A_1$ to $A_5$. Hence, in a non-straight section of the cooling gas exhaust device 38 cooling gas deflection surfaces 58 are arranged to divide the exhausted cooling gas stream A within the cooling gas exhaust device 38 into at least two partial cooling gas streams.

In the embodiment illustrated in FIG. 4 the exhausted cooling gas stream is divided into five partial cooling gas streams $A_1$ to $A_5$. However, according to the invention it is also preferable to divide the exhausted cooling gas stream in at least three, further preferably at least five, and in particular at least ten partial cooling gas streams $A_i$. In addition to the cooling gas deflection surfaces 58 a deflection plate 70 may be provided, which covers a corner region of the cooling gas exhaust device 38 and which also deflects the exhausted cooling gas stream from a vertical direction into a lateral direction. The cooling gas exhaust device 38 may also comprise further cooling gas deflection surfaces 58 or further deflection plates 70 to deflect the exhausted cooling gas stream A in bent regions of the cooling gas exhaust device 38 accordingly such that the cooling gas stream A is divided in partial cooling gas streams. In this manner, a non-uniform flow of the cooling gas stream A inside the cooling gas exhaust device 38 is avoided or at least reduced.

The variation coefficient of the flow velocity distribution at the inlet opening 52 may have values of up to 65% without providing cooling gas deflection surfaces 58. By providing the cooling gas deflection surfaces 58 according to the invention inside the cooling gas exhaust device 38 the variation coefficient of the flow velocity distribution at the inlet opening 52 of the cooling gas exhaust device can be reduced such that it is preferably smaller than 30%, further preferably smaller than 20% or 15%, and in particular smaller than 10%. Due to the cooling gas deflection surfaces 58 in the exhaust hood and in bendings of the cooling gas exhaust device 38 the flow at the inlet grid 68 may be made uniform up to a variation coefficient of about 10%, which corresponds to a reduction of pressure loss of about 60%. The cooling gas exhaust device 38 is here designed for an amount of exhaust air of about 5000 m³/h, wherein the opening area of the inlet opening 52 is within a region between 0.1 and 0.2 m².

By providing the cooling gas inflow device 32 according to the invention and the cooling gas exhaust device 38 according to the invention it is therefore possible to obtain a uniform stream of cooling gas onto the test specimen 14 as well as simultaneously drastic reduction of pressure loss within the exhaust device. Hence, according to the invention the flow duct is optimized such that comparability of measurement results as well as reproducibility of tests can be achieved. Further, the test specimens 14 are cooled uniformly during the measurement.

The invention claimed is:

1. A test bench for testing of vehicles or components of a vehicle, the test bench comprising:
   a test specimen holder configured to hold a test specimen and introduce a load onto the test specimen; and
   a cooling gas inflow device configured to cool the test specimen during introducing the load into the test specimen, by means of a cooling gas stream exiting an outlet opening of the cooling gas inflow device,
   wherein the cooling gas inflow device comprises cooling gas deflection surfaces and/or flow straightener such that the cooling gas stream inside the cooling gas inflow device is divided in at least a section of the cooling gas inflow device into at least two partial cooling gas streams,
   wherein the cooling gas inflow device comprises a cooling gas source and a supply,
   wherein the outlet opening is arranged in a vertical direction above the test specimen holder.

2. The test bench of claim 1, wherein the cooling gas inflow device is designed such that the cooling gas stream inside the cooling gas inflow device is divided in at least one section of the cooling gas inflow device into at least three partial cooling gas streams.

3. The test bench of claim 1, wherein the cooling gas source is a blower or an air conditioner having a blower.

4. The test bench of claim 1, wherein the cooling gas inflow device comprises cooling gas deflection surfaces arranged in a non-straight section of the cooling gas inflow device.

5. The test bench of claim 1, wherein the cooling gas inflow device comprises at least one flow straightener arranged in a straight section of the cooling gas inflow device.

6. The test bench of claim 1, wherein an end of the cooling gas inflow device facing the test specimen holder is configured to elongate telescopically such that a distance between the outlet opening of the cooling gas inflow device and the test specimen holder is adjustable.

7. The test bench of claim 6, wherein at least one flow straightener is arranged stationary with respect to the outlet opening of the cooling gas inflow device in the end of the cooling gas inflow device, and wherein the end is configured to elongate telescopically.

8. The test bench of claim 1, wherein the variation coefficient of the flow velocity distribution across the outlet diameter/width at the outlet opening of the cooling gas inflow device is smaller than 20%.

9. The test bench of claim 1, wherein the test bench is configured to test a brake.

10. The test bench of claim 1, further comprising a cooling gas exhaust device designed such that an exhausted cooling gas stream inside the cooling gas exhaust device is divided in at least one section of the cooling gas exhaust device into at least two partial cooling gas streams.

11. The test bench of claim 10, wherein the cooling gas exhaust device comprises cooling gas deflection surfaces arranged in a non-straight section of the cooling gas exhaust device.

12. The test bench of claim 10, wherein a variation coefficient of a flow velocity distribution at an inlet opening of the cooling gas exhaust device is smaller than 30%.

13. The test bench of claim 10, further comprising a housing in which the outlet opening of the cooling gas inflow device is arranged in a vertical direction above the test specimen holder, and in which an inlet opening of the cooling gas exhaust device is arranged in a vertical direction below the test specimen holder.

14. The test bench of claim 1, wherein a variation coefficient of a flow velocity distribution across the outlet diameter/width at the outlet opening of the cooling gas inflow device is smaller than 30%.

* * * * *